United States Patent [19]

Spector

[11] Patent Number: 4,642,250

[45] Date of Patent: Feb. 10, 1987

[54] FABRICS AND GARMENTS FORMED THEREBY HAVING THERMALLY-SENSITIVE CHROMATIC PROPERTIES

[76] Inventor: Donald Spector, 380 Mountain Rd., Union City, N.J. 07087

[21] Appl. No.: 818,347

[22] Filed: Jan. 13, 1986

[51] Int. Cl.⁴ .............................................. C09K 3/34
[52] U.S. Cl. ...................................... 428/1; 428/240; 428/283
[58] Field of Search ............................ 428/1, 240, 283

[56] References Cited

U.S. PATENT DOCUMENTS 3,847,139  11/1984  Flam ........................................ 428/1
4,510,188  4/1985  Ruggeri ................................... 428/1

Primary Examiner—Marion C. McCamish
Attorney, Agent, or Firm—Michael Ebert

[57] ABSTRACT

An article of apparel such as sportswear whose outer surface exhibits a chromatic pattern related to thermal variations in the body of the wearer. The fabric of the garment is tailored to make direct contact with the skin of the wearer at different body sites. Integrated with the fabric or portions thereof are cholesteric liquid crystals. These are subjected to heat energy emanating from the skin of the wearer and therefore to variations in temperature that depend on the amount of body heat being dissipated in the area of contact. Because these liquid crystals have temperature-sensitive chromatic properties, the color pattern displayed by the garment undergoes changes in the course of wear.

9 Claims, 4 Drawing Figures

FABRICS AND GARMENTS FORMED THEREBY HAVING THERMALLY-SENSITIVE CHROMATIC PROPERTIES

BACKGROUND OF INVENTION

1. Field of Invention

This invention relates generally to fabrics having cholesteric liquid crystals integrated therewith to impart temperature-sensitive chromatic properties thereto, and more particularly to articles of apparel which include such fabrics and which exhibit a color pattern that undergoes changes in the course of wear.

2. Status of Prior Art

A liquid crystal is an organic compound having properties that appear to be simultaneously fluidic and crystalline. The molecules of the crystal are actually at an intermediate thermodynamic state of matter, lying between the liquid and crystalline phases.

A cholesteric liquid crystal is formed in layers, each containing long molecules with their long axes parallel to the plane of the layer. The molecules are substantially flat but include a side chain of methyl groups that project upwardly from the plane of each molecule. The displacement necessary to accommodate this side chain causes rotation of the direction of the molecules from one layer to the next, and this gives rise to a helical structure having unique optical properties.

Cholesteric liquid crystals undergo chromatic changes when subjected to variations in temperature. In the early 1960's, James Fergason discovered that the iridescent spectral response of cholesteric liquid crystals could be exploited to measure thermal changes. (See J. Fergason, "Liquid Crystals," Scientific American 210, 77 (1967), and H. W. Gibson, "Cholesteric Liquid Crystals"—Liquid Crystals, The Fourth State of Matter (1979), Ed. F. D. Seeva, Marcel Decker, Inc., Chapter 3, 99).

Liquid crystal components, such as cholesteryl benzoate, cholesteryl chloride and cholesteryl oleate are commercially available, one source being the Pressure Chemical Company of Pittsburgh, Pa. This company offers a series of liquid crystal mixtures in semi-solid or in solution form to cover a series of temperature ranges. Each mixture is calibrated so that each color change occurs at a specific temperature. Thus, one can with one mixture produce a red color at, say, 110° F., the same temperature producing yellow with another mixture. Hence, one can predetermine the relationship of temperature to crystal color.

The semi-solid liquid crystal mixture can be heated to liquifaction and a thin film thereof spread on a substrate. When a thin film of the liquid crystal mixture is applied to a test surface and the surface is then heated or cooled, a thermograph of vivid colors is produced. While the film at ambient temperature is colorless, heating causes the film to become red, then yellow, green, blue, and violet, the changing colors being indicative of a progressively increasing temperature level. If, however, the test surface is cooled, the color sequence then takes place in reverse order. Thus, in this application, the liquid crystal film may be used for the measurement of surface temperature and also for non-destructive testing. Since liquid crystals selectively scatter rather than absorb light, a dark background is required for maximum color visibility.

SUMMARY OF INVENTION

The primary object of this invention is to provide a fabric having cholesteric liquid crystals integrated therewith, which fabric when included in a garment in contact with the human body undergoing chromatic changes that depends on the surface temperature of the body site in contact with the fabric.

The typical garment has an appearance which depends on the decorative nature of the fabric from which it is tailored. This appearance is predetermined by the ornamental design of the fabric. Thus, if a bathing suit is made of a red-dyed fabric with blue spots scattered thereover, then whether the suit is stored is in a drawer or is being worn on the beach or in a swimming pool, its outward appearance never changes.

The unique aspect of the present invention is that the fabric has an outward appearance or decorative pattern that when worn undergoes gradual chromatic changes which are not predictable and which therefore lend enormous appeal to the garment. The decorative pattern produced by a particular garment is personalized, for the same garment worn by another person will produce a different chromatic pattern. Thus, two individuals wearing exactly the same garment and standing side by side will present different chromatic patterns and hence appear to be wearing differently patterned garments.

A garment in accordance with the invention has no fixed decorative pattern, for the intriguing chromatic chromatic display exhibited thereby is related to the varying body temperature of the wearer in the body region in thermal contact with the fabric. Just as no two individuals have the same fingerprints, each individual possesses a unique thermo-print that reflects his own body temperature as it varies from site to site on the skin surface.

More particularly, an object of the invention is to provide a garment whose fabric or portions thereof have integrated therewith cholesteric liquid crystals which impart temperature-sensitive chromatic properties to the garment.

Also an object of the invention is to provide a fabric of the above type which is washable without degrading its chromatic properties.

Briefly stated, these objects are attained in an article of apparel such as sportswear whose outer surface exhibits a chromatic pattern related to thermal variations in the body of the wearer. The fabric of the garment is tailored to make direct contact with the skin of the wearer at different body sites. Integrated with the fabric or portions thereof are cholesteric liquid crystals. These are subjected to heat energy emanating from the skin of the wearer and therefore to variations in temperature that depend on the amount of body heat being dissipated in the area of contact. Because these liquid crystals have temperature-sensitive chromatic properties, the color pattern displayed by the garment undergoes changes in the course of wear.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
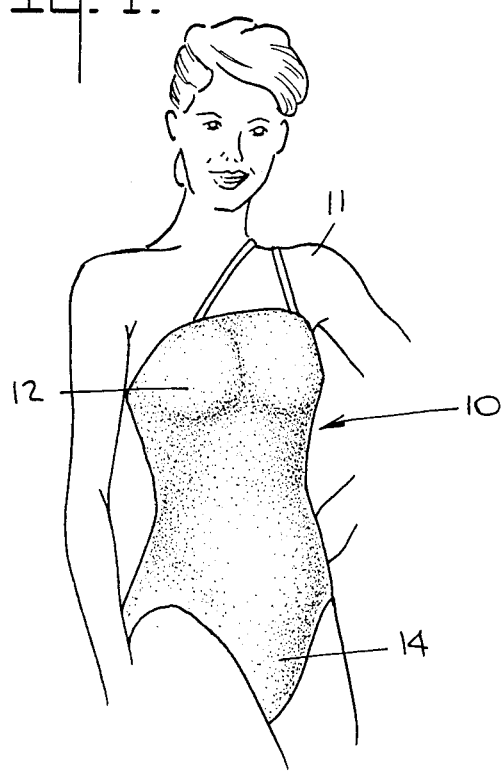
FIG. 1 is a front view of a bathing suit which is being worn by a woman, the suit being made, at least in part, of a fabric in accordance with the invention.
Figure 2:
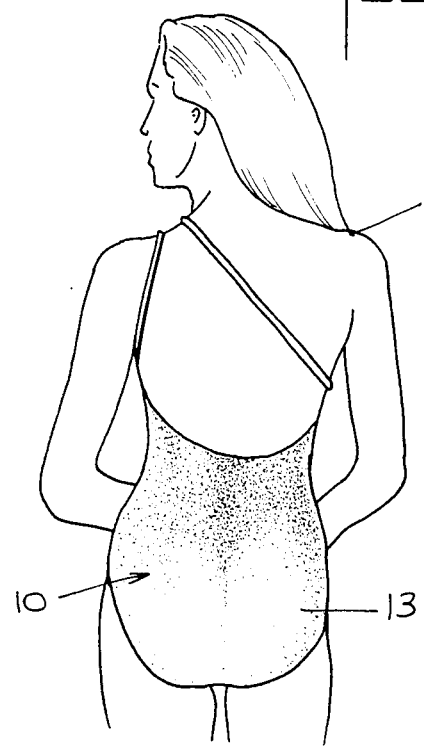
FIG. 2 is a rear view of the same bathing suit.

Referring now to FIGS. 1 and 2, there is shown in front view a body-hugging bathing suit generally identified by numeral 10 formed of a stretchable synthetic fabric which is dyed so that the yarns thereof are black to provide a dark background for maximum color visibility. A fabric suitable for this purpose is one made of Nylon-Lycra spandex. Lycra is the trademark for a spandex fiber in the form of continuous monofilaments. These are available in yarns with deniers ranging from 40 to 2240.

Because in this stretchable bathing suit the fabric is in direct contact with the body skin of the wearer 11, it is subjected to body heat by conduction and radiation. The interior of the human body has a normal temperature level which is usually said to be 98.6° F. Actually, however, in the course of each 24-hour period, the body temperature rises and falls above and below this nominal value within a plus and minus 5° F. range. On hot days during strenuous exercise, body temperature as high as 108° F. has been routinely observed with no apparent ill effects.

Body temperature is determined by the relationship existing between the amount of heat internally generated which depends on basal metabolism and the amount of heat escaping from the body. Additional heat is produced as a result of muscular activity, this being dissipated by an increase in radiation, conduction or evaporation from the skin surface. Thus, the skin is the interface between the internally-heated body and the atmosphere.

The skin surface temperature is not the same in all areas of the body. Thus, in the case of a woman, the skin surface temperature in the breast region is generally measurably higher than in the thigh region or in the posterior region.

In the case of bathing suit 10 which hugs the body, the portion 12 of the fabric which covers the breast region is subjected to a higher skin temperature than the fabric portion 13 which overlies the posterior region. And the portion 14 of the fabric which covers the region between the thighs is subjected to a higher skin temperature than the torso region thereabove.

In other words, if a thermograph were taken over those skin surfaces which engage the bathing suit fabric, it would reveal significant variations in temperature at these sites. And the temperature gradients would vary in the course of the day and also as a function of the activity of the wearer. Thus, if one were to play volley ball while wearing the suit, the thermograph would be quite different from that obtained when the wearer is at rest.

Figure 3:
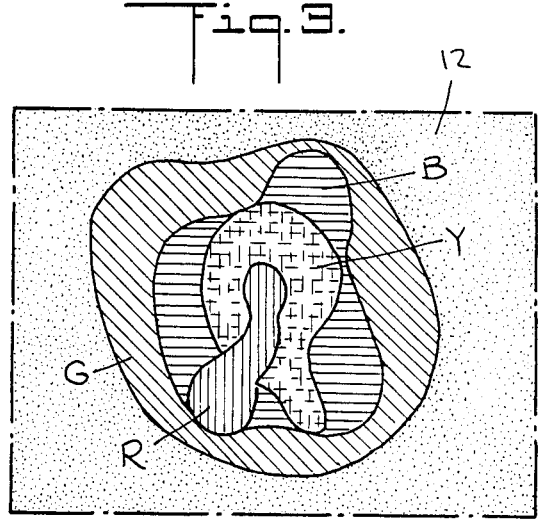
FIG. 3 illustrates the breast region of the suit and a color pattern produced thereon by the wearer.

In a garment in accordance with the invention, the fabric thereof or portions thereof have integrated therewith cholesteric liquid crystals which impart chromatic properties to the fabric. Thus, in the portion 12 of the fabric which overlies the breast, one possible chromatic pattern is that shown in FIG. 3, the pattern being made of a red zone R, a yellow zone Y, a blue zone B and a green zone G. Those portions of the fabric which receive relatively little heat from the body, as in the thigh areas, will remain the black color of the black dyed fabric.

The color zones created in this manner are not in any symmetrical, geometric or hard edge form, but have changing amorphous shapes in which there are no sharp lines of demarcation between contiguous zones of different color. These color patterns on the fabric reflect the underlying thermographic pattern on the body site and gradually undergo change.

The bathing suit shown in FIGS. 1 and 2 is merely by way of example. In practice, the garment may be in any known clothing configuration, such as blouses, shirts, shorts, stockings, headbands, neckpieces, etc. In order to be chromatically effective, portions of the garment must be in close proximity to or in direct contact with the skin of the wearer so as to respond to heat energy emanating therefrom.

The difficulty in applying cholesteric liquid crystals to a fabric is that in their natural state, they are an oily or pasty substance whose consistency is comparable to a hand lotion or a petroleum jelly. In the case of a stretchable fabric made from elastomeric polyurethane foam sheeting, a preferred application technique is to take up the liquid crystals in a solvent such as petroleum ether, and to spray the resultant liquid in a dispersion at a relatively high velocity onto the sheeting to cause the liquid to impregnate the outer face pores thereof. The solvent is then evaporated, so that the liquid crystals are securely lodged in the cells of the polyurethane material. In practice, the polyurethane formulation may have fine metal particles dispersed therein to enhance the thermal conductivity of the material.

In order to integrate cholesteric liquid crystals with a stretchable fabric of the type disclosed in connection with FIGS. 1 and 2, the preferred technique for this purpose is to micro-encapsulate the liquid crystals in minute, synthetic plastic casings. These casings are preferably formed of polyvinyl chloride or other thermoplastic materials.

Figure 4:
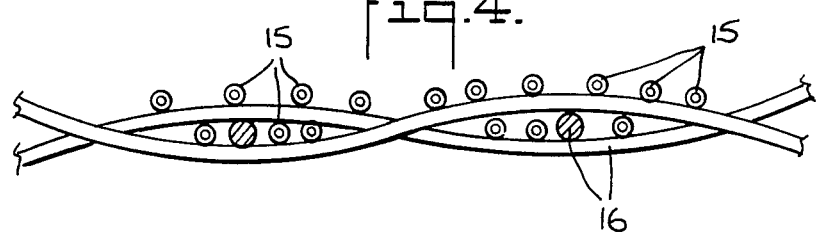
FIG. 4 illustrates in greatly magnified form some of the fabric yarns and the minute liquid crystals bonded thereto.

As shown in FIG. 4, these encapsulated crystals 15 are dispersed on the yarns 16 of the fabric and are bonded thereto, so that the liquid crystals will not wash out or be dislodged when the fabric is washed or otherwise cleaned. To effect such bonding use may be made of heat and pressure to sinter the thermoplastic casings of the encapsulated liquid crystals onto the yarn surface. Or one may use for this purpose a polymeric adhesive or other suitable bonding agent whose formulation is appropriate to the material of the yarn.

Techniques for encapsulating cholesteric liquid crystals are disclosed in the Hodson et al. U.S. Pat. No. 3,585,381. Dispersion systems for cholesteric liquid crystals are disclosed in the Benton et al. U.S. Pat. No. 3,872,050.

Instead of using cholesteric liquid crystals all having the same temperature-sensitive properties over the entire surface of the fabric or portions thereof, liquid crystals having disparate color responses may be used at different sites on the fabric. Hence, at a given temperature level, red will be produced at one site in response thereto, while yellow or some other contrasting color will be produced at another site. Or one may provide at a given site an assortment of liquid crystals having different color responses to produce multicolor mixtures.

Also, in practice, where the liquid crystals are embedded in a latex sheet or other elastomeric matrix, this sheet may be laminated to a woven or non-woven fabric mesh backing of natural fibers, such as cotton, or textured synthetic fibers which are moisture absorbent to provide a laminated fabric having a more comfortable feel when in contact with the skin.

Instead of micro-encapsulating cholesteric liquid crystals and bonding these crystals onto the fibers, they may be macro-encapsulated and at the same time integrated with the fibers of the fabric.

The technique for such macro-encapsulation is carried out by first spraying onto the fibers of the fabric a polyester solution, preferably one having the composition of clear Mylar or Dacron (polyethylene terephthalate). This solution is permitted to cure to form on the fibers a transparent and extremely thin base coating strongly adherent thereto. Then the fabric is sprayed with a solution of cholesteric crystals and the solvent permitted to evaporate to deposit on the base coating a thin core layer of cholesteric liquid crystals. Then a polyester solution is sprayed over this layer and permitted to cure to form an outer thin, transparent coating thereover which encapsulates the layer.

While such macro-encapsulation in the case of a fabric which is absorbent acts to reduce its absorbency, this is of no practical importance where the garment is a bathing suit or another garment in which moisture absorbency is not a necessary or desirable characteristic. With macro-encapsulation, the fabric so treated may be washed or otherwise cleaned without, in doing so, removing the encapsulated liquid crystals integrated with the fibers.

While there has been shown and described a preferred embodiment of fabrics and garments formed thereby having thermally-sensitive chromatic properties in accordance with the invention, it will be appreciated that many changes and modifications may be made therein without, however, departing from the essential spirit thereof.

I claim:

1. A garment fabric which when in contact with or in close proximity to the skin of a wearer exhibits a chromatic decorative pattern, said fabric having integrated therewith a dispersion of cholesteric liquid crystals having temperature-sensitive chromatic properties whereby the face of the fabric opposite the face next to the skin displays a color pattern that depends on the heat energy emanating from the skin and varies as a function of changes in this heat energy, said liquid crystals being macro-encapsulated by means constituted by a thin base coating of transparent polyester film bonded to the fibers of the fabric, a layer of unencapsulated liquid crystals dispersed on the base coating and a transparent polyester film forming an outer coating over the liquid crystal layer and bonded to the base coating.

2. A fabric as set forth in claim 1, wherein said fabric is dyed black to enhance the visibility of the chromatic pattern.

3. A fabric as set forth in claim 1, formed of stretchable material adapted to hug the body of the wearer.

4. A fabric as set forth in claim 3, wherein said stretchable material is formed of a combination of nylon and spandex fibers.

5. A fabric as set forth in claim 1, wherein said fabric is formed of an elastomeric sheet having a multitude of cells therein which are impregnated with said liquid crystals.

6. A fabric as set forth in claim 5, wherein said elastomeric sheet is formed of foam polyurethane material.

7. A fabric as set forth in claim 1, wherein said liquid crystals are dispersed on said fabric in limited areas thereof, the other areas being free of liquid crystals.

8. A fabric as set forth in claim 1, wherein said dispersion is composed of a mixture of liquid crystals having different chromatic properties to provide multi-color patterns.

9. A fabric as set forth in claim 1, wherein liquid crystals having disparate color responses are used at different sites on the fabric whereby at a given temperature level, one color is produced at one site and another color at another site.

* * * * *